Feb. 3, 1970  W. KAISER ET AL  3,493,893
HIGH ENERGY SYSTEM
Filed April 18, 1967

5 NANOSEC

INVENTORS:
WOLFGANG KAISER
HANS OPOWER
BY Lowry & Rinehart
ATTORNEYS

United States Patent Office 3,493,893
Patented Feb. 3, 1970

3,493,893
HIGH ENERGY LASER SYSTEM
Wolfgang Kaiser and Hans Opower, both of 21
Arcisstrasse, Munich 2, Germany
Filed Apr. 18, 1967, Ser. No. 631,791
Claims priority, application Germany, June 28, 1966,
K 59,614
Int. Cl. H01s *3/05*
U.S. Cl. 331—94.5        5 Claims

ABSTRACT OF THE DISCLOSURE

This disclosure provides a system including at least two lasers having resonators which operate in parallel and contain a bleachable filter. The filters are located within the system to be bleached at selectively varying relative time intervals by a light impulse. The system also includes a means for providing a light impulse to the said filters. The filters comprise either a dye solution or a solid substance which becomes transparent by radiation of a specific strength. The light impulse of the system transmitted by the parallel operating lasers may be modified by changing the length of the light path between the light impulse providing means and the parallel lasers. The output of the laser system made in accordance with this invention is higher than the maximum permissible output of a single laser.

BACKGROUND OF THE INVENTION

This invention relates to an optical emitter comprising a system of at least two lasers controlled by optical shutters.

An optical system of the specified kind comprising axially aligned lasers has already been proposed in the art. In this arrangement an optical shutter made of a photochromic glass is interposed between each two lasers. When this arrangement was proposed it was not yet possible to operate a single laser to its maximum output capacity. Therefore, in order to achieve the highest possible output power several laser rods were arranged and operated in series, the output in the final laser being substantially higher than that in the first laser. However, such known arrangements have the drawback that the final output that can be achieved is limited by the maximum output power which the laser material can emit without suffering damage.

The maximum power output that can be obtained from one laser is not yet sufficient for some purposes, such as the generation of microplasmas and plasma diagnostic purposes.

SUMMARY OF THE INVENTION

It is therefore the object of the present invention to permit the maximum available power output to be further increased. That is, the output of the system in itself is higher than the maximum permissible output of a similar single laser which is effecting the initial light impulse.

This object is attained according to the present invention in that the optical shutters are built into the resonators of lasers operated in parallel and are adapted to be opened at selectably varying relative time intervals.

The optical emitter proposed by the present invention has the advantage over arrangements already known in the art of being capable of emitting a sequence of light pulses at precisely determined time intervals. Firstly this invention permits the coincident emission of all light pulses which are equal in number to the number of lasers comprised in the system. Consequently the total output energy of the entire system that can be achieved is equal to the sum of the maximum outputs of each individual laser as determined by its maximum emission power, whereas in a normal optical system the total power output occurs in each laser element and can therefore never exceed the maximum which is imposed by the maximum emission power which the laser material can tolerate without damage.

Secondly, the emission of light pulses from the individual lasers has the additional advantage that the pulses can be spaced at shorter and more defined intervals of time than would be possible if the pulses were emitted by only one laser.

In an emitter as proposed by the invention it is preferred to use Kerr or Pockels cells as the optical shutters to be included in the necessary light impulse providing means. Such cells are well known in the art.

However, the optical shutters may also conveniently consist of a solution of a bleachable dye or they may consist of any other bleachable solid filter. Such filters are likewise known in the art. A filter has the advantage over a Kerr or Pockels cell that the transmitted light is of the highest spectral purity. Moreover, the use of filters considerably reduces the complexity of the system and simplifies the operation of an emitter as proposed by the invention.

It may also be advantageous to open the optical shutters simultaneously. As already mentioned, this permits the total emitted light power to be substantially raised.

In emitters as proposed by the invention which do not incorporate Kerr or Pockels cells it may be an advantage to open the optical shutters by a supplementary laser. The use of a supplementary laser offers both of the above-described possibilities of either causing the lasers to emit coincidently or in succession, as may be desired.

Another useful arrangement may be to mutually open the optical shutters by the individual lasers. This likewise leads to a substantially simplified system.

The supplementary laser may be controlled with a switching device such as a rotating mirror, by a Kerr or Pockels cell or by a bleachable filter. Such devices are well known in the art.

According to another useful feature the filters of all the lasers may contain a selectively bleachable dye. For the entire emitter system this affords the advantage that emission is confined to one frequency.

Furthermore, the optical shutters may be controlled to open at relatively defined intervals of time instead of coincidently.

Finally, in the case of emitters lacking Kerr or Pockels cells, it may be advantageous if the light paths between the supplementary laser and the optical shutters of the individual lasers are of different lengths.

BRIEF DESCRIPTION OF DRAWINGS

An embodiment of the invention comprising the use of bleachable filters will now be described by way of example and with reference to the accompanying schematic drawing, in which.

DESCRIPTION OF SPECIFIC EMBODIMENT

Figure 1:
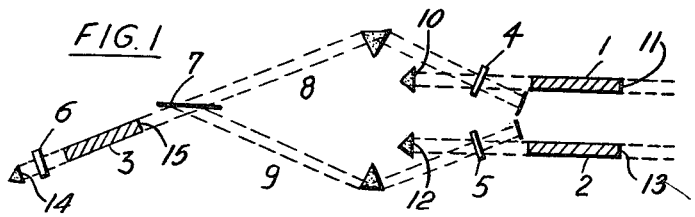
FIG. 1 illustrates the arrangement of two lasers operating in parallel under the control of a supplementary laser.

FIG. 1 shows two lasers 1 and 2 which operate in parallel and comprise each a back-reflecting mirror and an optical shutter 4 and 5 respectively. The optical shutters 4 and 5 are controlled by a supplementary laser 3 which itself contains an optical shutter 6. The beam emitted by the supplementary laser 3 is split by a semitransparent mirror 7 into two components of which each controls the optical shutters 4 and 5 of one of the two lasers 1 and 2, respectively. The two paths of the split beam are indicated by the reference numerals 8 and 9. The lasers may, with advantage, be ruby lasers. Preferably the optical shutters 4 and 5 consist of a solution of a suitable bleachable dye. For ruby lasers a solution of crypto-cyanine would be suitable. The parallel lasers include resonator boundary surfaces 10, 11 and 12, 13. The supplementary laser includes resonator boundary surfaces 14 and 15.

If, as is the case in FIG. 1, the lengths of the two paths 8 and 9 are identical, then the two lasers 1 and 2 will be simultaneously acted upon and a considerable increase of the emitted light power will be the result. On the other hand, if the lengths of the two paths 8 and 9 are chosen to be different, then the two lasers 1 and 2 will be acted upon with a definite time interval. The time interval can be much shorter than it is possible to achieve in conventional single laser systems. The arrangement proposed by the invention will be of value in systems intended for the generation of microplasmas or for plasma diagnostic purposes.

Figure 2:
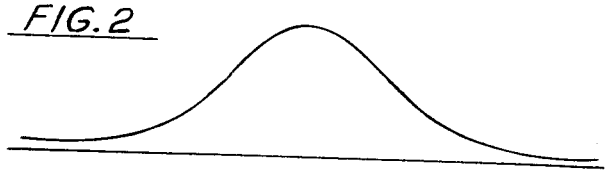
FIG. 2 shows a graph which represents the light pulse emitted by a single laser.
Figure 3:
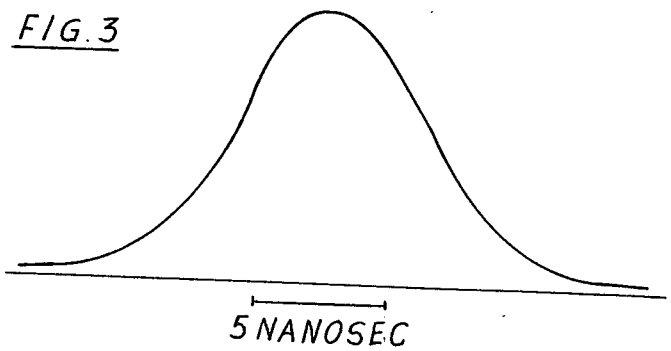
FIG. 3 shows a graph which represents a light pulse obtained from two synchronously working lasers in a system according to FIG. 1.

FIGS. 2 and 3 represent a light pulse generated by a synchronously operated laser system. The curves relate to a system of the kind illustrated in FIG. 1. The upper curve in FIG. 2 is a light pulse of the laser 1 whereas the lower curve is a combined simultaneous pulse of both lasers 1 and 2 of the system.

While the high energy optical laser system has been shown and described in detail, it is obvious that this invention is not to be considered as being limited to the exact form disclosed, and that changes in detail and construction may be made therein within the scope of the invention, without departing from the spirit thereof.

We claim:
1. A high power synchronized laser system comprising,
 (a) at least two lasers having resonators,
 (b) means to operate said lasers in parallel with respect to each other,
 (c) means mounting filters bleachable by radiation in said lasers,
 (d) said filters being located within said system to be bleached at selectively varying relative time intervals by a light impulse,
 (e) means providing a common light impulse simultaneously to said filters,
 (f) said light impulse providing means includes an auxiliary laser having a resonator to produce a light path to said bleachable filters in each of said parallel operating lasers to effect a high power output from said parallel operating lasers.
2. A system as defined in claim 1 wherein said auxiliary laser includes a switching device to produce said light impulse.
3. A system as defined in claim 2 wherein said switching device is a rotating mirror.
4. A system as defined in claim 2 wherein said switching device is a Kerr or Pockels cell.
5. A system as defined in claim 2 wherein said switching device is a bleachable filter.

References Cited
UNITED STATES PATENTS 3,346,741  10/1967  Mayer et al. _____ 307—88.3
3,312,905   4/1967  Lewis _____ 330—4.3

OTHER REFERENCES

"IBM Technical Disclosure Bulletin," (Fowler), November 1964, p. 544.

ROY LAKE, Primary Examiner

DARWIN R. HOSTETTER, Assistant Examiner

U.S. Cl. X.R.
330—4.3